June 12, 1928. 1,673,365

G. W. LEIMAN

SHAFT PACKING

Filed April 22, 1925

INVENTOR
George W. Leiman
BY
Brown Seward
ATTORNEYS

Patented June 12, 1928.

1,673,365

UNITED STATES PATENT OFFICE.

GEORGE W. LEIMAN, OF NEWARK, NEW JERSEY, ASSIGNOR TO LEIMAN BROS., OF NEWARK, NEW JERSEY, A COPARTNERSHIP COMPOSED OF WILLIAM H. LEIMAN, GEORGE W. LEIMAN, GUSTAVE A. LEIMAN, EDWARD C. LEIMAN, AND JOHN LEIMAN.

SHAFT PACKING.

Application filed April 22, 1925. Serial No. 25,008.

This invention relates to an improvement in shaft packing and more particularly to packing for rotary shafts of pumps and other machines, the object being to provide a structure which is simple, effective and durable.

Another object is to provide a packing for the shafts of rotary pumps having a structure capable of contacting with the adjacent cylinder head of the pump and the shaft, thereby forming efficient joints to prevent oil from being sucked from the oil receptacle through the shaft bearings to the interior of the cylinder and to prevent the escape of air therefrom.

Another object is to provide a structure, the elements of which will rotate with the shaft and cylinder of the pump.

Another object is to provide certain improvements in the form, construction and arrangement of the parts, whereby the above named and other objects may be effectively attained.

Figure 1:
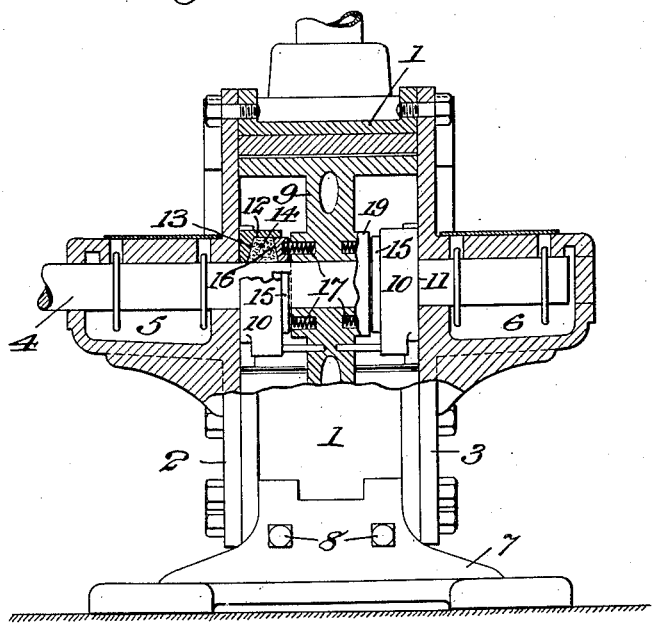

A practical embodiment of my invention is represented in the accompanying drawings, in which Fig. 1 represents a side elevation, partly in section, of a rotary pump having my improved shaft packing in position thereon.

Figure 3:
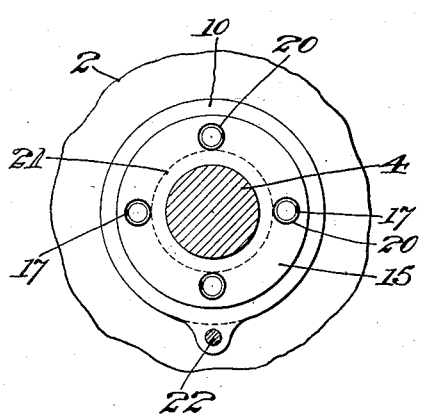
Figure 2:
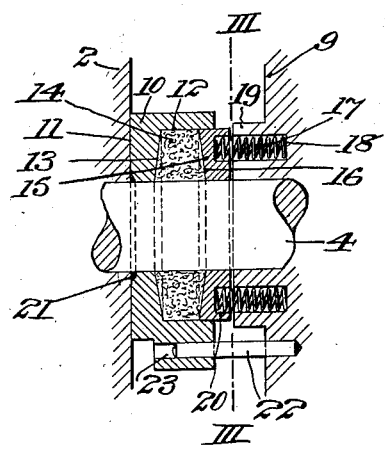

Fig. 2 represents a vertical section, on an enlarged scale, of one of the structures which embodies my invention, and Fig. 3 represents a vertical section taken in the plane of the line III—III of Fig. 2, looking in the direction of the arrows.

In the drawings I have shown this invention as applied to a rotary pump and directed largely to certain improvements in structures shown, described and claimed in my United States Letters Patent No. 1,493,045 dated May 6th, 1924 and United States Letters Patent No. 1,414,028 dated April 25th, 1922.

The cylinder is denoted by 1 and its heads by 2, 3. The shaft 4 extends eccentrically through the cylinder 1 passing through the heads 2, 3 and through suitable bearings in the oil receptacles 5, 6 connected to or formed integral with the outer face of the cylinder heads 2, 3 respectively. The cylinder is supported on a base 7 and secured thereto by means of bolts 8, which base may be bolted to the floor or other suitable support.

A piston 9, of cylindrical form, is fixed on the shaft 4 and provided with the usual vibrating wings (not shown).

To prevent the oil from being sucked from the oil receptacles 5, 6 through the shaft bearings to the interior of the cylinder, or to prevent the escape of air from within the cylinder, I provide a packing for each of the inner walls of the heads 2, 3 and the shaft journaled in the heads, each of which structures comprises a cylindrical member 10 having a vertically flat face 11, an annular chamber 12, the inner or end wall 13 of which is inclined. The chamber 12 is arranged to receive an elastic packing 14, which is held in position by a ring follower 15 having an inclined face 16 oppositely disposed to the end wall 13 of the chamber 12. This follower 15 is yieldingly held in position by a plurality of coil springs 17, spaced equidistance, one end of each of which springs is seated in a recess 18 in the hub 19 of the piston 9, while the other end rests in a pocket 20 formed in the face of the ring follower.

It will be understood that while the coil springs 17 urge the follower into the chamber 12 of the cylindrical member 10 and into contact with the elastic packing 14, the vertical face of the cylindrical member 10 will also be forced into intimate contact with the inner face of the adjacent cylinder head.

To provide lubrication for the contacting surfaces of the cylindrical member 10 and cylinder heads, the member 10 is formed with a beveled recess 21, which recess serves to collect and feed outwardly between the surfaces, certain of the oil carried by the shaft from the receptacles 5, 6.

In order to maintain the cylindrical member 10 and piston 9 in a fixed relation, I provide a pin 22, one end of which is fast in the piston 9, while the other end has a sliding fit in a hole 23 formed in the cylindrical member 10.

Thus it will be seen that the cylindrical member 10 is caused to rotate with the piston 9, allowing lateral movement on the shaft 4, and yieldingly held with its vertical face 11 in intimate contact with the inner face of the cylinder head.

I am enabled by this structure to maintain a tight joint between the shaft and the cylinder head and, by reason of the elastic packing 14 being yieldingly held in the chamber 12 by the follower 15 and springs 17, to effect a tight joint between the shaft 4 and the cylindrical member 10.

It is obvious that various changes may be resorted to in the form, construction and arrangement of the several parts without departing from the spirit and scope of my invention; hence, I do not wish to be limited to the details herein shown and described except as they may be specifically included in the claims.

What I claim is:—

1. The combination with a pump having a rotary piston, cylinder heads, and a shaft journaled in said heads, of packing devices movable with said piston and shaft and arranged to coact with said cylinder heads, each of said devices comprising a cylindrical member having a relatively large flat face disposed to contact with the adjacent cylinder head, a longitudinal bore therethrough for the shaft, the junction of said face and wall of the bore being beveled to form a relatively small open recess in the face adjacent the shaft for the reception of oil to be fed to the face and cylinder head, and an annular chamber, an elastic packing in said chamber, a ring follower movable longitudinally on the shaft in the chamber to engage said packing, and springs interposed between the piston and follower for holding the packing in the chamber and the vertical face of the cylindrical member in contact with its cylinder head.

2. The combination with a pump having a rotary piston, cylinder heads, and a shaft journaled in said heads, of packing devices movable with said piston and shaft and arranged to coact with said cylinder heads, each of said devices comprising a cylindrical member having a relatively large flat face disposed to contact with the adjacent cylinder head, a longitudinal-bore therethrough for the shaft, the junction of said face and wall of the bore being beveled to form a relatively small open recess in the face adjacent the shaft for the reception of oil to be fed to the face and cylinder head, and an annular chamber, an elastic packing in said chamber, a ring follower movable longitudinally on the shaft in the chamber to engage said packing, recesses in said piston, springs located in said recesses in position to engage the follower for holding the packing in the chamber and the vertical face of the cylindrical member in contact with its cylinder head, and pins carried by the piston arranged to engage the cylindrical members for maintaining the members in fixed relation with respect to the piston and shaft.

In testimony that I claim the foregoing as my invention, I have signed my name this 21st day of April, 1925.

GEORGE W. LEIMAN.